United States Patent
Gee et al.

(10) Patent No.: US 10,220,671 B2
(45) Date of Patent: Mar. 5, 2019

(54) ELECTRIFIED VEHICLE CONDITIONING USING GRID POWER

(71) Applicant: FORD GLOBAL TECHNOLOGIES, LLC, Dearborn, MI (US)

(72) Inventors: Thomas Scott Gee, Canton, MI (US); Mazen Hammoud, Dearborn, MI (US); Kevin Layden, Plymouth, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 435 days.

(21) Appl. No.: 14/628,940

(22) Filed: Feb. 23, 2015

(65) Prior Publication Data
US 2016/0243920 A1  Aug. 25, 2016

(51) Int. Cl.
*B60H 1/00* (2006.01)

(52) U.S. Cl.
CPC ..... *B60H 1/00392* (2013.01); *B60H 1/00778* (2013.01)

(58) Field of Classification Search
CPC ................. B60H 1/00; H02J 7/00; G06F 7/00
USPC ....................... 701/36, 22; 320/109, 137, 155
See application file for complete search history.

(56) References Cited

U.S. PATENT DOCUMENTS

| | | |
|---|---|---|
| 2012/0234930 A1 | 9/2012 | Wijaya |
| 2013/0096734 A1* | 4/2013 | Tonegawa .......... B60H 1/00257 701/2 |
| 2013/0271074 A1 | 10/2013 | Federico et al. |
| 2013/0325259 A1* | 12/2013 | Kwon ................ B60H 1/00642 701/36 |
| 2014/0039735 A1 | 2/2014 | Major et al. |
| 2014/0277869 A1 | 9/2014 | King et al. |
| 2015/0035486 A1* | 2/2015 | Yamaguchi ......... B60L 11/1816 320/109 |

FOREIGN PATENT DOCUMENTS

| | | |
|---|---|---|
| EP | 2679418 | 1/2014 |
| KR | 1020120062443 | 6/2012 |

* cited by examiner

*Primary Examiner* — Thomas G Black
*Assistant Examiner* — Luat T Huynh
(74) *Attorney, Agent, or Firm* — Carlson, Gaskey & Olds, P.C.

(57) ABSTRACT

An exemplary method includes conditioning an electrified vehicle to maintain a target conditioning level using power from a grid source. The conditioning either lasts from a conclusion of a first drive cycle to the beginning of a second drive cycle that is subsequent the first drive cycle, or lasts from a conclusion of a first drive cycle for set time.

19 Claims, 2 Drawing Sheets

ELECTRIFIED VEHICLE CONDITIONING USING GRID POWER

TECHNICAL FIELD

This disclosure relates to conditioning an electrified vehicle using grid power, which can reduce the battery power required during a drive cycle and thus extend an electric driving range for the electrified vehicle.

BACKGROUND

Generally, electrified vehicles differ from conventional motor vehicles because electrified vehicles are selectively driven using one or more battery-powered electric machines. Conventional motor vehicles, by contrast, are driven exclusively by an internal combustion engine. The electric machines can drive the electrified vehicles instead of, or in addition to, an internal combustion engine. Example electrified vehicles include all-electric vehicles, hybrid electric vehicles (HEVs), plug-in hybrid electric vehicles (PHEVs), fuel cell vehicles, and battery electric vehicles (BEVs).

Batteries of electrified vehicles can be recharged at the conclusion of a drive cycle using power from a grid source. The amount of power that a battery of an electrified vehicle can accept from the grid source can be limited by several factors including, the battery's state of charge and temperature. In some situations, such as DC fast charge situations, significant power, in excess of the power required to charge the battery, may be available from the grid source.

SUMMARY

A method according to an exemplary aspect of the present disclosure includes, among other things, conditioning an electrified vehicle to maintain a target conditioning level using power from a grid source. The conditioning either lasts from a conclusion of a first drive cycle to the beginning of a second drive cycle that is subsequent the first drive cycle, or lasts from a conclusion of a first drive cycle for set time In a further non-limiting embodiment of the foregoing method, the method includes heating an area of the electrified vehicle to raise a temperature of the area to a temperature target during the conditioning.

In a further non-limiting embodiment of any of the foregoing methods, the temperature target is set by a user of the electrified vehicle.

In a further non-limiting embodiment of any of the foregoing methods, the method further includes overconditioning the area to a temperature that is higher than the temperature target.

In a further non-limiting embodiment of any of the foregoing methods, the area is a cabin of the electrified vehicle.

In a further non-limiting embodiment of any of the foregoing methods, the method includes cooling an area of the electrified vehicle to lower a temperature of the area to a temperature target during the conditioning.

In a further non-limiting embodiment of any of the foregoing methods, the temperature target is set by a user of the electrified vehicle.

In a further non-limiting embodiment of any of the foregoing methods, the method further comprises overconditioning the area to a temperature that is lower than the temperature target.

In a further non-limiting embodiment of any of the foregoing methods, the area is a cabin of the electrified vehicle.

In a further non-limiting embodiment of any of the foregoing methods, the area is a battery of the electrified vehicle.

In a further non-limiting embodiment of any of the foregoing methods, the method includes charging the battery using power from the grid source during the conditioning.

In a further non-limiting embodiment of any of the foregoing methods, the conditioning continues actively from the conclusion of the first drive cycle to the start of the second drive cycle.

In a further non-limiting embodiment of any of the foregoing methods, the set time is adjustable by a user of the electrified vehicle.

A method according to another exemplary aspect of the present disclosure includes, among other things, conditioning an electrified vehicle to maintain a target conditioning level using power from a grid source. The conditioning lasts from the end of a first drive cycle to the beginning of a second drive cycle that is subsequent the first drive cycle.

In a further non-limiting embodiment of the foregoing method, the conditioning maintains a temperature of the vehicle to a temperature target.

In a further non-limiting embodiment of any of the foregoing methods, the method further comprises overconditioning the vehicle to a temperature that is intentionally adjusted higher or lower than a temperature target.

In a further non-limiting embodiment of any of the foregoing methods, the target conditioning level is a temperature target that is a range of temperatures.

An electrified vehicle conditioning assembly according to yet another exemplary aspect of the present disclosure includes, among other things, a controller that is activated to selectively direct power from a grid source to an electrified vehicle. The power is used to condition the electrified vehicle to maintain a target conditioning level. The controller is configured to remain active from a conclusion of a drive cycle until a set time.

In a further non-limiting embodiment of the foregoing assembly, the set time is adjustable by a user of the electrified vehicle.

The embodiments, examples and alternatives of the preceding paragraphs, the claims, or the following figures and description, including any of their various aspects or respective individual features, may be taken independently or in any combination. Features described in connection with one embodiment are applicable to all embodiments, unless such features are incompatible.

DESCRIPTION OF THE FIGURES

The various features and advantages of the disclosed examples will become apparent to those skilled in the art from the detailed description. The figures that accompany the detailed description can be briefly described as follows.

DETAILED DESCRIPTION

This disclosure relates generally to charging a battery using grid power and, in some examples, to using excess grid power to reduce energy consumption during a drive cycle.

Figure 1:
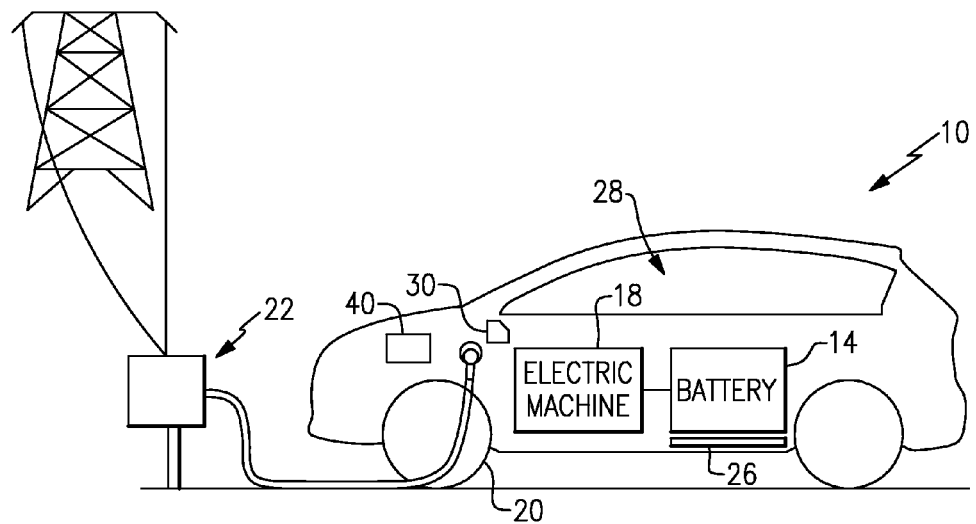
FIG. 1 illustrates a schematic view of an example electrified vehicle.

Referring to FIG. 1, an example electric vehicle 10 includes a battery 14 to power an electric machine 18. The vehicle includes wheels 20 driven by the electric machine 18. The electric machine 18 receives electric power from the battery 14 and converts the electric power to torque. The example battery 14 is a relatively high-voltage battery when compared to other vehicle battery types, such as a 12-Volt accessory battery.

The example vehicle 10 is an all-electric vehicle. In other examples, vehicle 10 is a hybrid electric vehicle, which selectively drives wheels using an internal combustion engine instead of, or in addition to, the electric machine 18. In hybrid electric examples, the electric machine 18 may selectively operate as a generator to recharge the battery 14.

The vehicle 10, when parked, can be plugged into a grid source 22, such as a charging station. Power from the grid source 22 moves to the vehicle 10 and can be used for recharging the battery 14. Power from the grid source 22 moves to the vehicle 10 and can be used for conditioning the vehicle 10 to a target conditioning level.

Conditioning the vehicle 10 to the target conditioning level can include powering a heater 26 to heat the battery 14. Heating the battery 14 prior to a drive cycle can improve efficiencies when the vehicle 10 is then driven in relatively cold conditions.

Conditioning the vehicle 10 to the target conditioning level can instead include powering a chiller (not shown) to cool the battery 14. Cooling the battery 14 prior to a drive cycle can improve efficiencies when the vehicle 10 is then driven in relatively warm conditions.

Conditioning the vehicle 10 can further include heating or cooling a cabin 28 of the vehicle 10 using a heat exchanger 30.

Conditioning the vehicle 10 to the target conditioning level can still further include heating or cooling seats of the vehicle 10, a steering wheel of the vehicle 10, lubricants and other fluids of the vehicle 10, etc. That is, although conditioning is described primarily in connection with the battery 14 and the cabin 28, conditioning can include using power from the grid source 22 to heat or cool other areas of the vehicle 10.

The target conditioning level, in this example, includes a temperature target for the battery 14 and a temperature target for the cabin 28. Both of the example temperature targets are set by a user of the vehicle 10. In other examples, one or both of the temperature targets is not set by the user and is instead determined by the vehicle 10, or preprogrammed into the vehicle 10.

In this example, when the battery 14 is heated or cooled to the temperature target, the battery 14 is heated or cooled to be within a range of, say two degrees Celsius, of the temperature target for the battery 14 that is set by the user. Notably, the temperature of the battery 14 does not need to be precisely at the temperature target set by the user to be considered maintained at the temperature target. The actual temperature can vary somewhat from the temperature target set by the user and still be considered at the temperature target.

An appropriate range of variation from the precise temperature target set by the user can be two degrees Celsius. For example, if the user sets the temperature target for the battery 14 at twenty degrees Celsius, the heater 26 will maintain the battery 14 temperature to be from eighteen to twenty-two degrees Celsius when the vehicle 10 is connected to the grid source 22. Accordingly, if a temperature of the battery 14 is eighteen degrees Celsius, the battery 14 is still considered to be at the temperature target since the temperature of the battery 14 is within an acceptable range for the temperature target.

Like the temperature target, the acceptable range may be programmed into the vehicle 10 or may be adjustable by the user.

When the cabin 28 is heated or cooled to the temperature target, the cabin 28 is heated or cooled to be within a range of, say two degrees Celsius, of the temperature target for the cabin 28 that is set by the user. As with the battery 14, the temperature of the cabin 28 does not need to be precisely at the temperature target to be considered maintained at the temperature target. Some variation can be acceptable.

For example, if the user desires for the cabin 28 to have a temperature of twenty degrees Celsius at the start of a drive cycle, the heat exchanger 30 will maintain the cabin 28 temperature to be from eighteen to twenty-two degrees Celsius when the vehicle 10 is connected to the grid source 22. Accordingly, if a temperature of the cabin 28 is twenty-two degrees Celsius, the cabin 28 is still considered to be at the temperature target since the temperature of the cabin 28 is within an acceptable range from the temperature target set by the user. Like the acceptable range for the battery 14, an acceptable range around the temperature target for the cabin 28 may be programmed into the vehicle 10 or may be adjustable by the user.

In the prior art, vehicles have been preconditioned when connected to grid power source. Such vehicles start to be preconditioned in response to a go-time. A user may, for example, program the vehicle to begin preconditioning at a go-time, such as 6:00 am every morning. The prior art vehicles, however, do not maintain a target conditioning level from the end of a drive cycle to the start of a subsequent drive cycle or a set time.

In contrast to the prior art, in the example vehicle 10, the conditioning to maintain a target conditioning level lasts from the conclusion of an initial drive cycle until the start of a subsequent drive cycle or until a set time. Maintaining the target conditioning level from the conclusion of an initial drive cycle can more efficiently use power from the grid source 22 than the conditioning in prior art vehicles.

If a driver of the vehicle 10 parks the vehicle 10 and plugs into the grid source 22 at the conclusion of an initial drive cycle, the vehicle 10 maintains the target conditioning level until expiration of a set time, such as thirty minutes, or until the beginning of the next drive cycle.

The set time can be adjustable by the user or could be programmed into the vehicle 10.

Notably, in examples where the target conditioning level is maintained from the conclusion of the initial drive cycle to the beginning of the next drive cycle, the vehicle 10 will be conditioned to the target conditioning level regardless when the next drive cycle begins. For example, if the driver leaves the vehicle 10 and then returns to the vehicle 10 sooner than initially expected, the driver can still begin the next drive cycle with the vehicle 10 at the target conditioning level.

In some examples, the target conditioning level for the vehicle 10 can involve some amount of overconditioning. Overconditioning, for purposes of this disclosure, can involve the target conditioning level that is maintained for the cabin 28 being a few degrees higher than a temperature target for the cabin 28, and even a few degrees higher that the acceptable range of temperatures where the cabin 28 is consider to be at the temperature target.

For example, when the temperature target for the cabin 28 is twenty degrees Celsius, the cabin 28 is still considered at the temperature target when a temperature of the cabin 28 is twenty-two degrees Celsius. Overconditioning can then raise the temperature of the cabin 28 above twenty-two degrees Celsius. Overconditioning can raise and maintain the temperature of the cabin 28 to twenty-three degrees Celsius, for example.

In other examples, the overconditioning can involve the target conditioning level that is maintained for the cabin 28 or the battery 14 being a few degrees lower than the temperature target for the cabin 28 or the battery 14.

Notably, the overconditioning uses power from the grid source 22. Thus, when a drive cycle is started and the vehicle 10 is disconnected from the grid source 22, less power from the battery 14 is required to keep the cabin 28, the battery 14, or both, at the temperature target.

For example, less power would be used during a drive cycle to maintain the temperature at twenty degrees Celsius is the vehicle 10 begins the drive cycle with the cabin 28 at twenty-three degrees Celsius verses beginning the drive cycle with the cabin 28 at twenty-two degrees Celsius. The power saved due to the overconditioning can be used to extend a driving range for the vehicle 10.

If, when connected to the grid source 22, all of the power from the grid source 22 is required to charge the battery 14 overconditioning, and even conditioning, may not be an option.

The vehicle 10, in some examples, may permit the user to select or deselect overconditioning as an option. The option may be presented as an "EXTEND ELECTRIC MODE" option. The option may be presented through a user interface within the vehicle.

The example vehicle includes a controller 40 that is used during the conditioning. The controller can receive as input data from the user, temperature sensors, and other areas of the vehicle 10.

The controller 40 can include a processor operatively linked to a memory portion. The processor can be programmed to execute a conditioning program stored in the memory portion. The conditioning program may be stored in the memory portion as software code.

The program stored in the memory portion may include one or more additional or separate programs, each of which includes an ordered listing of executable instructions for implementing logical functions.

The processor can be a custom made or commercially available processor, a central processing unit (CPU), an auxiliary processor among several processors associated with the controller 40, a semiconductor based microprocessor (in the form of a microchip or chip set) or generally any device for executing software instructions.

The memory portion can include any one or combination of volatile memory elements (e.g., random access memory (RAM, such as DRAM, SRAM, SDRAM, VRAM, etc.)) and/or nonvolatile memory elements (e.g., ROM, hard drive, tape, CD-ROM, etc.). The memory may further incorporate electronic, magnetic, optical, and/or other types of storage media. Note that the memory can also have a distributed architecture, where various components are situated remotely from one another, but can be accessed by the processor.

Figure 2:
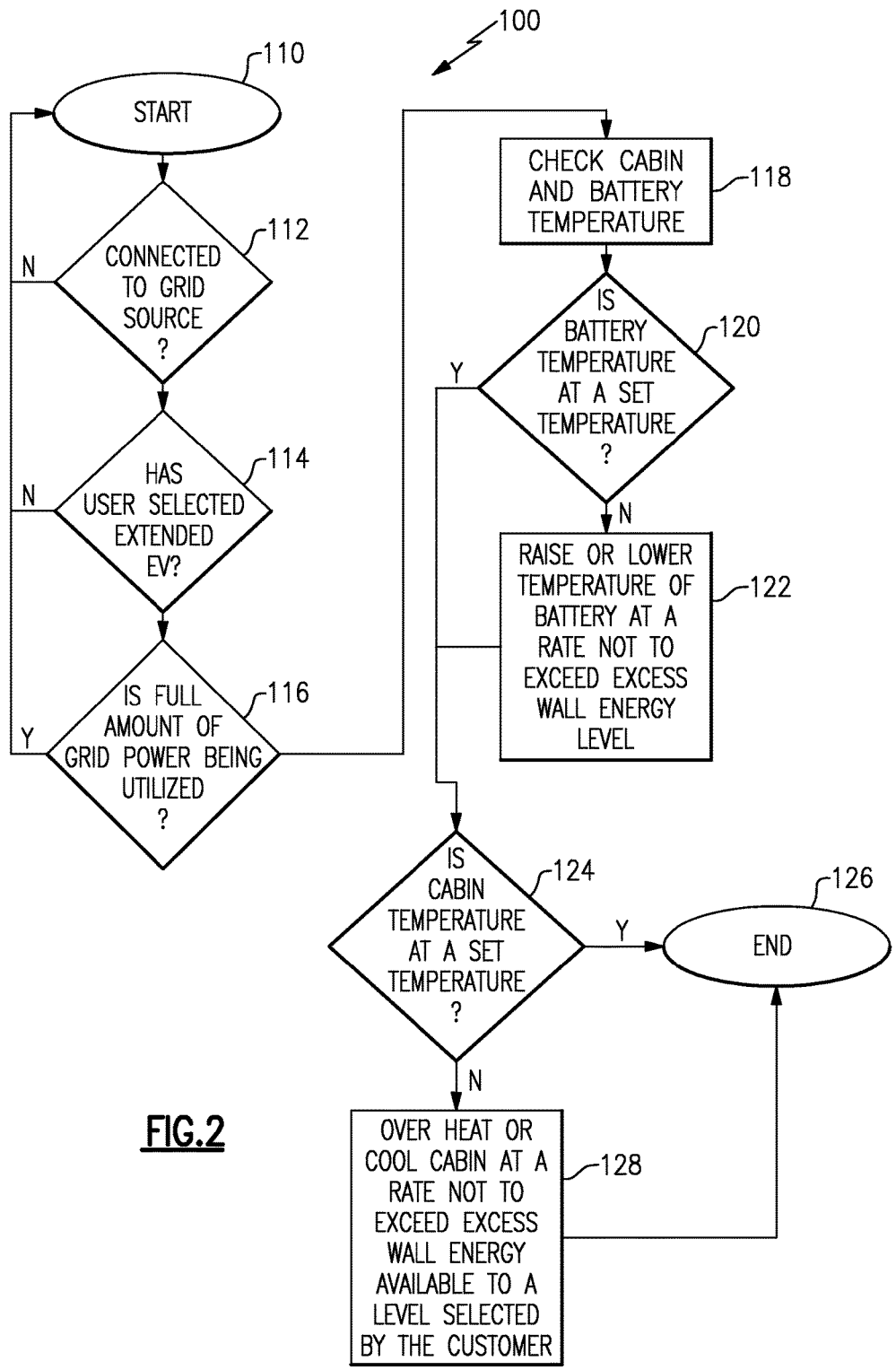
FIG. 2 illustrates a flow of an example method for overconditioning the vehicle of FIG. 1.

Referring now to FIG. 2 with continuing reference to FIG. 1, a method 100 is an example type of conditioning program executed by the processor of the controller 40 and stored within the memory portion of the controller 40.

The conditioning program of the method 100 is an overconditioning program that starts at a step 110. At a step 112, the method 100 confirms whether the vehicle 10 is connected to the grid source 22. If no, the method 100 returns to the step 110. If yes, the method moves to a step 114.

At the step 114, the method 100 calculates whether the user has selected an extended electric vehicle mode. If no, the method returns to the step 110. If yes, the method 100 moves to a step 116.

At the step 116, the method 100 calculates if the full amount of power from the grid source 22 is utilized. The full amount of power from the grid source 22 may be utilized if the state of charge for the battery 14 is relatively low, for example. If the state of charge is relatively high, the full amount of power from the grid source 22 may not be used and the excess power from the grid source 22 can be used for conditioning.

If the full amount of power from the grid source 22 is being utilized at the step 116, the method returns to the step 110. If the full amount of power from the grid source 22 is not utilized, the method moves to a step 118.

At the step 118, the method 100 checks a temperature of the cabin 28 and the battery 14. Sensors, such as thermocouples or thermistors, can be used to check these temperatures.

The method 100 then progresses to a step 120 where the method 100 calculates if the temperature of the battery 14 is at a temperature target. The step 120 may consider the temperature of the battery 14 to be at the temperature target if the temperature of the battery 14 is within, say two degrees Celsius, of the temperature target.

The user may provide the temperature target. The temperature target could also be programmed into the vehicle 10.

If the temperature of the battery 14 is not at the temperature target, the method moves to a step 122. If the temperature of the battery 14 is at the temperature target, the method moves to a step 124.

At the step 122, the temperature of the battery 14 is raised or lowered in the step 122 at a rate that does not exceed the amount of power from the grid source 22 that is available in excess of the power from the grid source 22 that is required to, for example, charge the battery 14. That is, the temperature of the battery 14 is not raised or lowered at a rate that exceeds the amount of excess power available from the grid source 22.

The method 100 moves from the step 122 to the step 124.

At the step 124, the method 100 calculates whether the temperature of the cabin 28 is at a temperature target, or, as with the battery 14, within a range of the temperature target. The user may establish the temperature target for the cabin 28. The temperature target could also be programmed into the vehicle 10.

If the temperature of the cabin 28 is at the temperature target in the step 124, the method 100 moves to the step 126 where the method 100 ends. If the temperature of the cabin 28 is not at the temperature target, or within an appropriate range of the temperature target in the step 124, the method moves to the step 128.

In the step 128, the temperature of the cabin is overheated or overcooled using excess power from the grid source 22. The rate at which the cabin 28 is overheated or overcooled would not require power in excess of that which is required to, for example, charge the battery 14.

After the overheating or overcooling in the step 128, the method 100 moves to the step 126 where the method 100 ends.

The method 100 then continues to monitor the temperature of the battery 14 and the cabin 28 while the vehicle 10 is on plug until the next drive cycle or until a set time expires. In other words, the example method 100 can be continuous and ongoing while the vehicle 10 is connected to the grid source 28.

The preceding description is exemplary rather than limiting in nature. Variations and modifications to the disclosed examples may become apparent to those skilled in the art that do not necessarily depart from the essence of this disclosure. Thus, the scope of legal protection given to this disclosure can only be determined by studying the following claims.

We claim:

1. A method, comprising:
   conditioning an electrified vehicle to maintain a target conditioning level using power from a grid source, the conditioning either lasting from a conclusion of a first drive cycle to the beginning of a second drive cycle that is subsequent the first drive cycle, or lasting from a conclusion of a first drive cycle for set time.

2. The method of claim 1, further comprising heating an area of the electrified vehicle to raise a temperature of the area to a temperature target during the conditioning.

3. The method of claim 2, wherein the temperature target is set by a user of the electrified vehicle.

4. The method of claim 3, further comprising overconditioning the area to a temperature that is higher than the temperature target.

5. The method of claim 2, wherein the area is a cabin of the electrified vehicle.

6. The method of claim 1, further comprising cooling an area of the electrified vehicle to lower a temperature of the area to a temperature target during the conditioning.

7. The method of claim 6, wherein the temperature target is set by a user of the electrified vehicle.

8. The method of claim 7, further comprising overconditioning the area to a temperature that is lower than the temperature target.

9. The method of claim 6, wherein the area is a cabin of the electrified vehicle.

10. The method of claim 6, wherein the area is a battery of the electrified vehicle.

11. The method of claim 10, further comprising charging the battery using power from the grid source during the conditioning.

12. The method of claim 1, wherein the conditioning continues actively from the conclusion of the first drive cycle to the start of the second drive cycle.

13. The method of claim 1, wherein the set time is adjustable by a user of the electrified vehicle.

14. A method, comprising:
    conditioning an electrified vehicle to maintain a target conditioning level using power from a grid source, the conditioning lasting from the end of a first drive cycle to the beginning of a second drive cycle that is subsequent the first drive cycle.

15. The method of claim 14, wherein the conditioning maintains a temperature of the vehicle to a temperature target.

16. The method of claim 14, further comprising overconditioning the vehicle to a temperature that intentionally adjusted higher or lower than a temperature target.

17. The method of claim 14, wherein the target conditioning level is a target temperature that is a range of temperatures.

18. An electrified vehicle conditioning assembly, comprising:
    a controller that is activated to selectively direct power from a grid source to an electrified vehicle, the power used to condition the electrified vehicle to maintain a target conditioning level, the controller configured to remain active from a conclusion of a drive cycle until a set time.

19. The assembly of claim 18, wherein the set time is adjustable by a user of the electrified vehicle.

* * * * *